(12) United States Patent
Milne et al.

(10) Patent No.: US 11,580,542 B2
(45) Date of Patent: Feb. 14, 2023

(54) DISTRIBUTED DATABASE STORED AT AN EDGE APPLICATION

(71) Applicant: Dwolla, Inc., Des Moines, IA (US)

(72) Inventors: Benjamin P. Milne, Des Moines, IA (US); Nicholas Leeper, Des Moines, IA (US); Skyler Nesheim, Des Moines, IA (US)

(73) Assignee: Dwolla, Inc., San Francisco, CA (US)

( * ) Notice: Subject to any disclaimer, the term of this patent is extended or adjusted under 35 U.S.C. 154(b) by 209 days.

(21) Appl. No.: 16/834,745

(22) Filed: Mar. 30, 2020

(65) Prior Publication Data

US 2021/0304199 A1 Sep. 30, 2021

(51) Int. Cl.
*G06Q 20/40* (2012.01)
*H04L 9/40* (2022.01)
*G06F 16/23* (2019.01)
*G06F 16/27* (2019.01)

(52) U.S. Cl.
CPC ....... *G06Q 20/401* (2013.01); *G06F 16/2379* (2019.01); *G06F 16/27* (2019.01); *H04L 63/0823* (2013.01)

(58) Field of Classification Search
CPC ..... G06F 16/2379; G06F 16/27; G06Q 20/02; G06Q 20/4037; G06Q 20/388; G06Q 20/401; H04L 63/0823
See application file for complete search history.

(56) References Cited

U.S. PATENT DOCUMENTS 5,465,328 A * 11/1995 Dievendorff ........ G06F 11/1471
714/E11.13
6,687,714 B1 * 2/2004 Kogen ............... G06Q 20/4037

2003/0222138 A1 * 12/2003 Oppenlander ........ G07F 7/1008
235/380
2007/0157320 A1   7/2007 Collins
2010/0030817 A1 * 2/2010 Shang ..................... G06F 16/27
707/610
2019/0349190 A1  11/2019 Smith
2021/0149775 A1 * 5/2021 Novotny ............. G06F 16/2379

FOREIGN PATENT DOCUMENTS

WO    WO 2019/148209    8/2019

OTHER PUBLICATIONS

International Searching Authority "Search Report", in Application No. PCT/US21/23739, dated Jun. 4, 2021, 9 pages.

* cited by examiner

*Primary Examiner* — Scott S Trotter
(74) *Attorney, Agent, or Firm* — Hickman Becker Bingham Ledesma LLP (57) ABSTRACT

Systems and methods for reducing latency in transactions are described herein. In an embodiment, an application edge acts as a system of record for an application. When a client computing device sends a request to perform a transaction to the application, the application edge receives the request and, without forwarding the request to a backend computing network, searches a transaction datastore stored at the application edge for the account balance and responds to the client computing device with the account balance. The client computing device then determines that a transaction can be performed and sends a request to perform the transaction to the application. The application edge passes this request to the backend computing network which performs the requested transaction. The application edge then uses a webhook infrastructure to update each transaction datastore stored at the application edge.

17 Claims, 3 Drawing Sheets

DISTRIBUTED DATABASE STORED AT AN EDGE APPLICATION

FIELD OF THE DISCLOSURE

The present disclosure relates to computations performed at application edge devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

In modern digital transactions, transaction speed can be extremely important. With high-speed trading, massive numbers of online consumer transactions, and the rise of user to user transfer applications, keeping transaction speed down becomes more important and more difficult.

Some systems operate under an assumption that a transaction will be completed and provide the results of the transaction while it is still in progress. Yet even these systems usually first ensure that the transaction can and will be completed in the background. For instance, when a stock-selling application receives a request to purchase stock, the application may check the balance of the purchaser and, if sufficient, transfer the stock immediately while the funds transfer is still pending.

Even with inferring the performance of a transaction, the speed of transactions is still limited by the initial step of checking an account balance. To check the account balance through an application, there are usually a number of hops through which a message must travel. For instance, when a request is sent to an application, the request reaches an edge content delivery network (CDN), passes through a transport layer security (TLS) proxy server, regenerates from the edge of the CDN to the edge of a cloud server, regenerates to a load balancer, and is sent to a stateless containerized application which fulfills the output from the database.

While some applications cache subsets of information used, thereby allowing quicker access, the cache is not treated as a system of record. Thus, the cache must be checked to determine if the data is stored there. Additionally, data stored in a cache in one location may differ from data stored in a cache in a second location. Thus, while cached data is often used for faster retrieval, it easily becomes outdated and a backend central datastore must be accessed as the system of record. Additionally, cached data rarely has the functionality of a database, as most cached data only includes data retrieved in response to queries and not the actual records underlying a database.

Thus, there is a need for a system which speeds up transactions by reducing a number of hops to be performed to access a system of record.

SUMMARY

The appended claims may serve as a summary of the disclosure.

DETAILED DESCRIPTION

In the following description, for the purposes of explanation, numerous specific details are set forth in order to provide a thorough understanding of the present disclosure. It will be apparent, however, that the embodiments may be practiced without these specific details. In other instances, well-known structures and devices are shown in block diagram form in order to avoid unnecessarily obscuring the present disclosure.

General Overview

Systems and methods for reducing latency in transactions are described herein. In an embodiment, an application edge acts as a system of record for an application. As used herein, the term "application edge" refers to one or more devices which act as an initial point of entry to one or more computing devices that host an application, such as routers, routing switches, integrated access devices, multiplexers, edge servers, and other access devices. Requests sent to an application are originally received by and often passed through the application edge before being routed to the backend services.

A system "acts as a system of record" when the system is a true source for all data retrieval of a particular type for one or more applications. To act as a system of record, a system must be able to respond to all queries for the type of data for which the system acts as a system of record with the most up to date information available in the system. For example, a system of record for transaction balances would store all transaction balances and could thus respond to any query regarding transaction balances. A system of record is a contrast to a cache which generally stores a subset of a type of information, often including responses to previous queries, but can also be incomplete or contain data which has been previously changed.

When a client computing device sends a request to perform a transaction to the application, the application edge receives the request and, without forwarding the request to a backend computing network, searches a transaction datastore stored at the application edge for the account balance, and responds to the client computing device with the account balance. The client computing device then determines that a transaction can be performed and sends a request to perform the transaction to the application. The application edge passes this request to the backend computing network which performs the requested transaction. The application edge then uses a webhook infrastructure to update each transaction datastore stored at the application edge.

In an embodiment, a transaction datastore is stored at a particular application edge. The transaction datastore acts as a system of record for one or more applications; receiving, at the application edge from a client computing device, a request for transaction information; without forwarding the request from the application edge, responding to the request for transaction information with data stored in the transaction datastore.

Structural Overview

Figure 1:
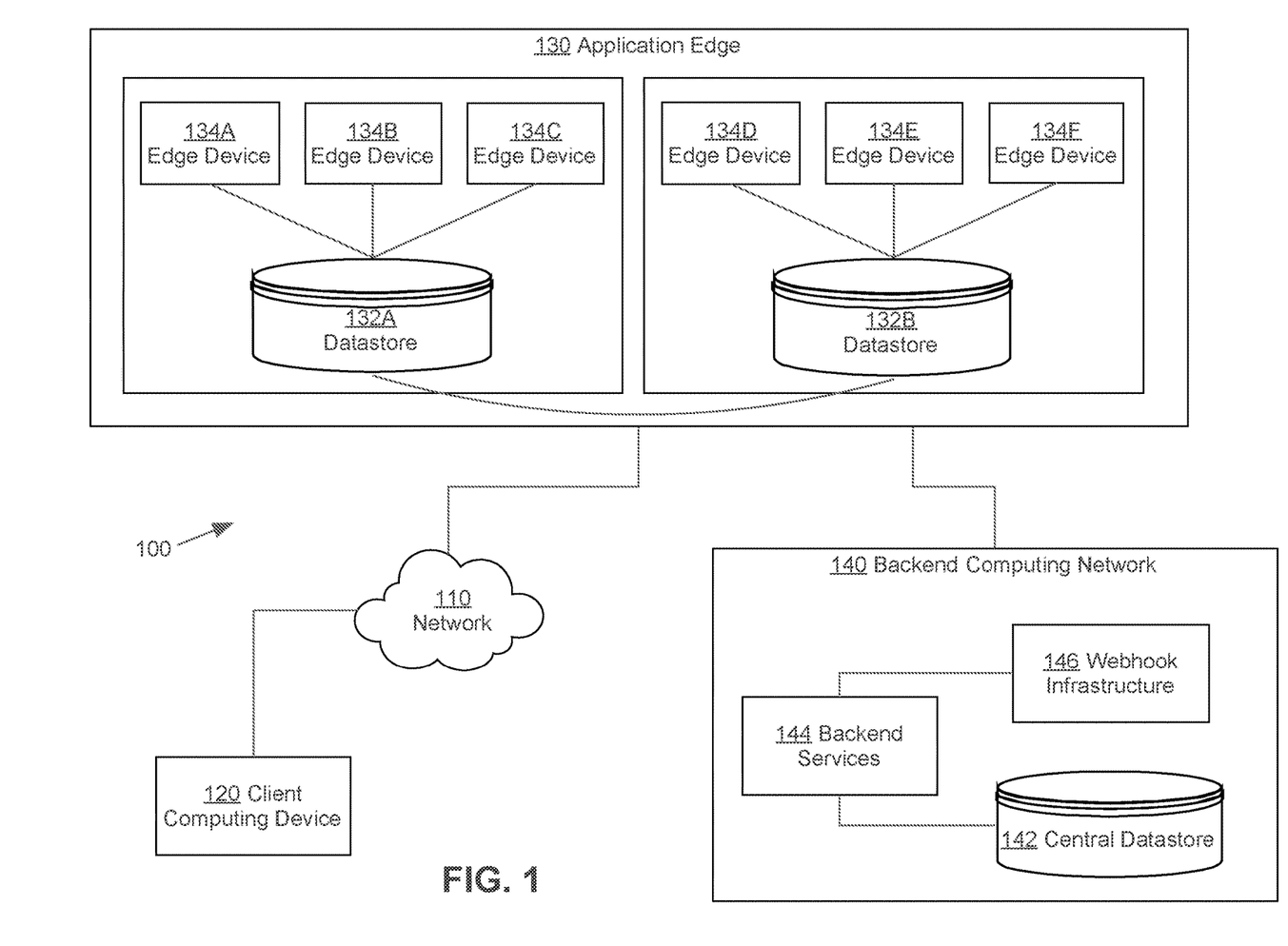
FIG. 1 depicts an example system for implementing a distributed datastore on an application edge.

FIG. 1 depicts an example system for implementing a distributed datastore on an application edge. As used herein, an application refers to one or more programs that are designed for an end user. The software is provided to an end user through one or more computing devices, including one or more devices configured to provide backend support to the application and an application edge comprising one or more edge devices which act as initial entry points to the backend devices.

System 100 comprises client computing device 120, application edge 130, and backend computing network 140 communicatively coupled over network 110. The application edge 130 and backend computing network 140 comprise an application network configured to provide application services to the client computing device 120. Network 110 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The client computing device 120, application edge 130, and backend computing network 140, and other elements of the system may each comprise an interface compatible with the network 110 and are programmed or configured to use standardized protocols for communication across the networks such as TCP/IP, Bluetooth, and higher-layer protocols such as HTTP, TLS, and the like.

Client computing device 120 comprises a computer that includes hardware capable of communicatively coupling client computing device 120 to one or more other computing devices, such as edge devices 134A-134F. For example, the client computing device 120 may include a network card that communicates with one or more devices through a home or office wireless router (not illustrated in FIG. 1) coupled to an internet service provider. Client computing device 120 may be a smart phone, personal computer, tablet computing device, PDAs, laptop, or any other computing device capable of transmitting and receiving information and performing the functions described herein.

In an embodiment, client computing device 120 executes an application which is hosted by one or more computing devices. The computing devices hosting the application may comprise devices within an application edge 130 and devices in a backend computing network 140. Messages sent to the one or more computing devices hosting the application are originally received by one or more devices in the application edge 130. Thus, application edge 130 is an initial point of access to the one or more computing devices. In embodiments, the one or more computing devices may additionally include a proxy server, such a transport layer security (TLS) termination proxy server, a content delivery network (CDN) server, a load balancer device, and/or one or more other devices. The one or more computing devices may comprise physical devices, such as server racks, and/or virtual devices, such as cloud servers.

Application Edge 130 comprises a network of edge computing devices. Edge devices 134A-134F comprise devices which provide entry points into application networks. The edge devices exist at the logical extreme of a network, thereby being the last devices to touch data being sent to a client computing device and being the first device to receive data from a client computing device. Thus, the application edge, which includes the edge devices, comprises a point of entry into an application network, the application network comprising one or more server computers. Examples of edge devices comprise routers, routing switches, integrated access devices, multiplexers, edge servers, and other access devices.

Datastores 132A and 132B are accessed by edge devices 134A-134F. Data in datastore 132A may be replicated in datastore 132B using the methods described herein, thus allowing either datastore to act as a system of record for transactions. As used herein, a system of record comprises a location or locations which a system, such as an application network, is configured to access as a definite source for all values for a specific type of data. The system of record differs from a cache in that a cache only stores a subset of values and only usually acts as a first source of information. If queried data is not found in a cache, a backend system is assumed to carry said data. In contrast, a system of record is configured to be the definitive source for all values of a specific type of data. Thus, if a query to the system of record returns no matches, the system will not query a different source.

Application edge 130 acts as an initial entry point for backend computing network 140. Backend computing network 140 comprises a network of backend services supported by an application. Backend services 144 may be implemented on one or more server computers. Backend services may provide application data, user interfaces, and/or track user information. Backend services 144 access a central datastore 142, central datastore 142 comprising application storage. Backend services 144 further communicate with a webhook infrastructure 146. Webhook infrastructure 146 comprises one or more computing devices configured to update application edge 130 in response to changes made to central datastore 142.

System of Record Requests

In an embodiment, an application edge acts as a system of record for an application. For example, an application may be configured to store data relating to one or more services, such as transaction records, account balances, previous application states, or other information. The application edge may provide primary storage of one or more types of information, thereby acting as the system of record for that type of information. For instance, the application edge may comprise an edge computing device communicatively coupled to a data store, the data store comprising a primary source for data records. As an example, the data store may comprise a plurality of key-value pairs, the key-value pairs including account identifiers and account balances. As the primary source of information, the data store may comprise all key-value pairs that can be requested for account balances. Thus, the application edge does not merely provide a cache of a subset of data records, but comprises the source of the data records.

The application edge may be configured to provide requested information to a client computing device. For example, a client computing device may send a request to an application server for information stored by the application, such as a request for account balances, a request for application state data, and/or other requests for information stored and/or or tracked by the application. The request is initially received by an edge content delivery network (CDN) which is configured to connect backend services with client computing devices.

The application edge fulfills the request using the data stored in the data store. The application edge may be configured to use the data store as the primary source of information, thereby responding to the information request without passing the request to the backend services. In an embodiment, the requests fulfilled by the application edge comprise read requests, while write requests are forwarded to the backend services along with requests for any other services aside from information.

The benefit of using the application edge as a system of record is that it ensures a faster turnaround time for all information requests, not just requests where a correct portion of the information is cached at the edge. This provides reliably fast responses to requests for information, which may be vital to particular internet services. For example, performance of financial transactions often requires a system to ensure that the transaction can be performed based on account balances. With the application edge acting as the system of record for account balances, the information can be obtained and the transaction can be initiated faster than was previously possible. In instances of high-volume transactions or high-speed transactions, the difference in time to complete a transaction can have a large impact.

Datastore Updates Through Webhooks

In an embodiment, multiple instances of a datastore are accessed by multiple different edge devices. For instance, application edge 130 in FIG. 1 comprises two sets of edge devices, edge devices 134A-134C and edge devices 134D-134F, each set of edge devices accessing a different datastore. Thus, in order for application edge 130 to act as a system of record, updates to the any of the data records should be propagated to data records in each of the datastores such that the information in datastore 132A matches the information in datastore 132B, thereby allowing a computing device to receive the same response regardless of which edge device is accessed.

To ensure that data is replicated across all of the distributed data stores, the system may use a webhook infrastructure to keep the edge devices updated. A webhook infrastructure, as used herein, comprises one or more devices which are configured to use webhooks to communicate with each other. The webhook infrastructure may be configured to update edge devices in response to a write command being implemented with respect to a back-end data store. For example, a backend network may store a central datastore comprising data records for the application. The data stored in the central datastore may be replicated at the application edge in the distributed datastore. The system may be configured to respond to read commands using data stored at the application edge, but forward write commands to the backend computing network to update the central datastore.

In response to determining that the central datastore has received an update, update records may be sent to each datastore in the distributed datastore at the application edge. For example, webhooks may be configured to respond to data being stored in the central database by sending update records to each datastore comprising the changes made to the central datastore. The update records may comprise replacement records, new records, and/or updates or changes to existing records stored in the distributed datastore. The update records may additionally comprise authentication information so that the application edge can determine that the update record is a valid update record received from a trusted source. The authentication information may include a signature from the central datastore or other means of validating the update records.

In an embodiment, the application network utilizes a methodology for handling webhooks idempotently. For example, an edge device may determine, when an update record is received, whether the same update record had been received previously by the edge device. If the record had been previously received, the edge device may not process the update record a second time.

By using a webhook infrastructure, the system ensures that the application edge is always kept up to date. Changes to the central datastore act as a catalyst to the sending of updated information. Thus, the system is able to update the edge devices each time a change is made, thereby allowing the edge devices to act as a system of record, since the data stored in the application edge would not be marked as invalid, but would instead be updated as changes are made to the central datastore.

Example Financial Implementation

Figure 2:
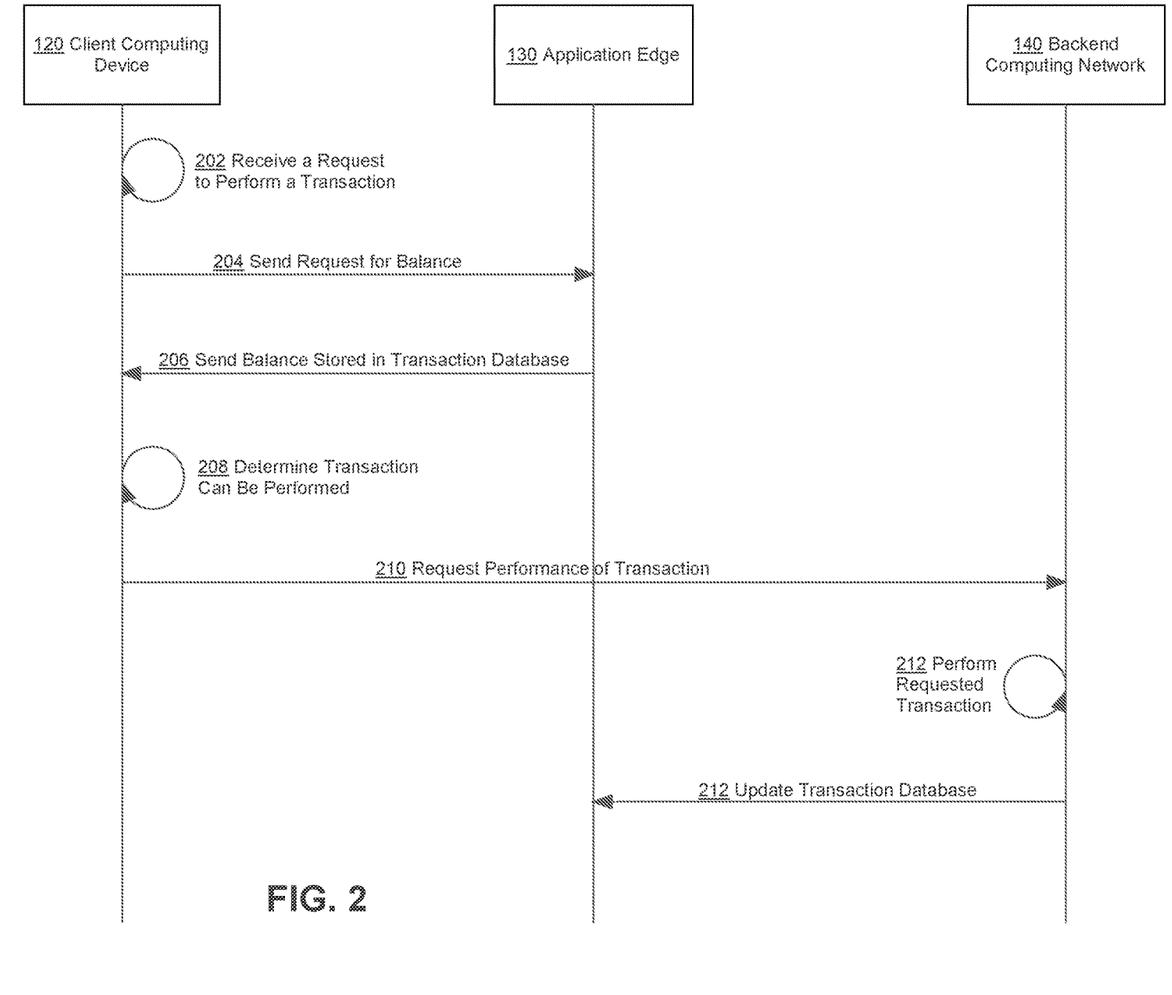
FIG. 2 depicts an example method for using a datastore stored on an edge computing device to reduce transaction time.

FIG. 2 depicts an example method for using a datastore stored on an edge computing device to reduce transaction time. FIG. 2 depicts a specific example for performing a financial transaction using the edge computing devices to reduce transaction time, but other examples may include faster browser bootup or initialization of a game with profile data stored at a server computer.

At step 202, client computing device 120 receives a request to perform a transaction. For example, the client computing device 120 may receive user input request a transfer of funds from an account corresponding to the client computing device 120 to a different account. The request to transfer funds may be part of financial transfer and/or part of a purchase, such as a purchase of stocks.

At step 204, client computing device 120 sends a request to application edge 130 for an account balance. For example, prior to initiating a transaction, the client computing device 120 may store configuration data for an application which causes the client computing device to, in response to receiving a request to perform a transaction, request the account balance to determine whether the transaction can be performed. The request for the account balance may include an account identifier corresponding to an instance of the application executing on the client computing device. Client computing device 120 may send the request directly to the application through an application programming interface (API). When application edge 130 intercepts the request, application edge 130 may be configured to determine that the request can be handled by application edge 130 because it is a request for an account balance and, in response, not forward the request to backend computing network 140 and instead process the request at application edge 130. Additionally or alternatively, client computing device 120 may be configured to specify that application edge 130 is the target for the request.

At step 206, application edge 130 sends a balance stored in the transaction datastore. For example, the application edge may store, in the transaction datastore, transaction balances for each application account, the application accounts comprising user accounts with the application. To keep the edge computing devices lightweight, the transaction datastore may be configured to store only current balances and corresponding account identifiers. Thus, when client computing device 120 sends the request to the application with the account identifier, the application edge may perform a lookup of the account identifier in the transaction datastore and respond with the corresponding balance.

At step 208, client computing device 120 determines that the transaction can be performed. For example, client computing device 120 may compare a transaction amount with the account balance to determine if the transaction amount is less than or equal to the account balance. If so, client computing device 120 may determine that the transaction can be performed. Client computing device 120 may additionally or alternatively incorporate additional rules, such as a minimum balance or maximum transaction amount/percent to determine whether the transaction can be performed.

At step 210, client computing device 120 sends a request to backend computing network 140 to perform the transaction in response to determining that the transaction can be performed. For example, client computing device may send a request to perform the transaction to the application through the API. As the request is a request to perform a transaction, the request may be initially received at the application edge and forwarded to the backend computing network 140. In an embodiment, in addition to forward the request to perform the transaction, client computing device 120 additionally indicates that the transaction is being performed, such as through a display or through a message to another computing device. Thus, transaction confirmation speeds are increased as they only require the initial message to and from the application edge. This can allow for high speed purchases, such as purchases of stock, which require confirmation that a transfer is being performed before the transaction can be concluded.

While steps 206-210 comprise the client computing device determining whether the transaction can be performed, in some embodiments, the determination is made at the application edge. For example, client computing device 120 may send a transaction request through an API to an application. The transaction request may be received at the application edge which is configured to initially check the account balance in the transaction datastore to determine if the transaction can be performed. If the application edge determines that the transaction can be performed, the application edge may send a verification that the transaction is being performed and forwards the transaction request to the backend computing network. The verification may be sent to the requesting device and/or a receiving device. Thus, confirmation of the transaction can be received with even greater speed, thereby increasing the efficiency in which transactions can be verified.

At step 212, backend computing network 140 performs the transaction. Performing the transaction may comprise initiating a funds transfer, such as through Automated Clearing House (ACH), National Settlement Services (NSS), or other forms of electronic funds transfers. Backend computing network 140 may also update a central datastore to indicate a change in balance of the account from which the transfer was made.

In an embodiment, performing the transaction comprises updating records in the central datastore. For example, a transfer of electronic currency or of currency controlled by the application may be performed through a change in values in the central datastore. As a practical example, if account A requests a transfer of $50 to account B, performing the transaction may comprise storing a transaction record indicating the transfer and decrementing a stored account balance for account A by $50 and incrementing a stored account balance for account B by $50.

In an embodiment, performing the transaction comprises updating label balances. For example, a system may use labels as described in patent application Ser. No. 16/354, 055, filed Mar. 14, 2019, the entire contents of which are hereby incorporated by reference as if fully set forth herein. The transaction datastores may each store labels and corresponding label balances which are used to determine whether an account can perform a transaction. Performing the transaction may comprise updating a central repository by decrementing a value of a first label and incrementing a value of a second label.

At step 214, backend computing network 140 sends an update to application edge 130. For example, in response to performing the transaction, the backend computing network 140 may be configured to update application edge 130 with changes to account balances which application edge 130 uses to update transaction datastores, such as through the webhook updates described above.

While examples have been described where client computing device 120 is a requesting device, in some embodiments client computing device 120 is a receiving device. For example, client computing device 120 may comprise one or more computing devices hosting an application which is used to sell physical or virtual goods or services. When a user requests a purchase through the hosted application, client computing device 120 may authorize the user and send a request through an API to perform the transfer. Client computing device 120 may receive the data that the transfer is being initiated from the application edge which verifies the transaction can be performed. Client computing device 120 is then able to complete the transaction through delivery of the purchased item even prior to completion of the transaction by the backend services.

Mutual Authentication at the Edge

In an embodiment, the application edge performs mutual authentication prior to responding with the balance. For example, a communication endpoint may be stored at the application edge. The communication endpoint may be configured to use mutual TLS (mTLS) authentication where the communication endpoint authenticates the client computing device and simultaneously authenticates itself to the client computing device.

The mTLS authentication may be performed by the application edge through a public key infrastructure (PKI) which manages encryption and digital certificates. In response to the request from the client computing device, the application edge may identify a stored PKI certificate which is used to authenticate the client computing device's ability to access a balance in the data repository.

As a practical example, a client computing device may be authorized to access account data for one or more accounts stored in the data repositories. The client computing device may receive a request to perform a transaction and, in response, send a message through an API of an application. When the message reaches the application edge, the application edge may perform the mutual authentication based on a PKI certificate sent with the request to determine if the client computing device can access data stored in the transaction datastore stored at the application edge. Upon authenticating the client computing device, an edge device at the application edge may send requested information from the transaction datastore to the client computing device.

Additional Implementations

In an embodiment, the systems and methods described herein may be utilized to decrease browser boot times. For example, the application edge may act as a system of record for information the browser uses at startup, such as initial parameters for a user accessing the browser and/or access to virtual goods or services, such as premium memberships. When the client computing device accesses the browser, the application edge may identify the initial parameters and/or other interface elements based on the user and send the data to the client computing device.

Other implementations may be used for online video games. Save states, including saved attributes, currencies, or other values individualized to a player may be stored at the application edge. When initializing the video game, a request for initial save states may be sent to the application edge along with an identifier of the player. The application edge may search a datastore comprising initializing data for different players and respond to the request, thereby allowing a game to load initial statistics quickly, thereby allowing faster access to the game. When one of those values changes, such as through gameplay, the webhook implementation may be used to update the datastores, thereby ensuring correct accurate startup the next time the video game is initialized.

Benefits of Certain Embodiments

Transactions over a network have built in delays based on a number of hops before transaction information can be retrieved. By using the application edge as the system of record for transaction information, the methods and systems described herein increase the speed at which transactions occur. Additionally, the systems and methods used herein increase the speed at which a transaction can be confirmed. Thus, in instances where high speed transacting is important, a transaction can be confirmed with a quick back-and-forth to the application edge while a longer transaction processing occurs in the backend. Unlike conventional systems which require communicating to backend services to confirm a transaction, embodiments described herein can be utilized to complete transactions faster, as the recipient of a transfer can initiate a response to the transfer, such as a transfer of stocks or an update of stored data to indicate that one or more items have been purchased, based on the confirmation message received prior to the actual backend completion of the transfer.

Additionally, utilizing edge devices to respond to read requests reduces the load on backend hardware which typically has a higher load. Edge devices may be used to reduce the load on the backend hardware while being more computationally efficient. The edge devices may also be used as a means of scaling out legacy applications without requiring a complete rewrite of backend software by shifting functions to edge devices.

Additionally, the systems and methods described herein provide benefits to browser or game boot times by providing initialization information from the application edge. Changes to the initialization information can be used to update datastores when a user exits a browser or game, thereby ensuring that the datastore is updated when the user next opens the browser or game.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
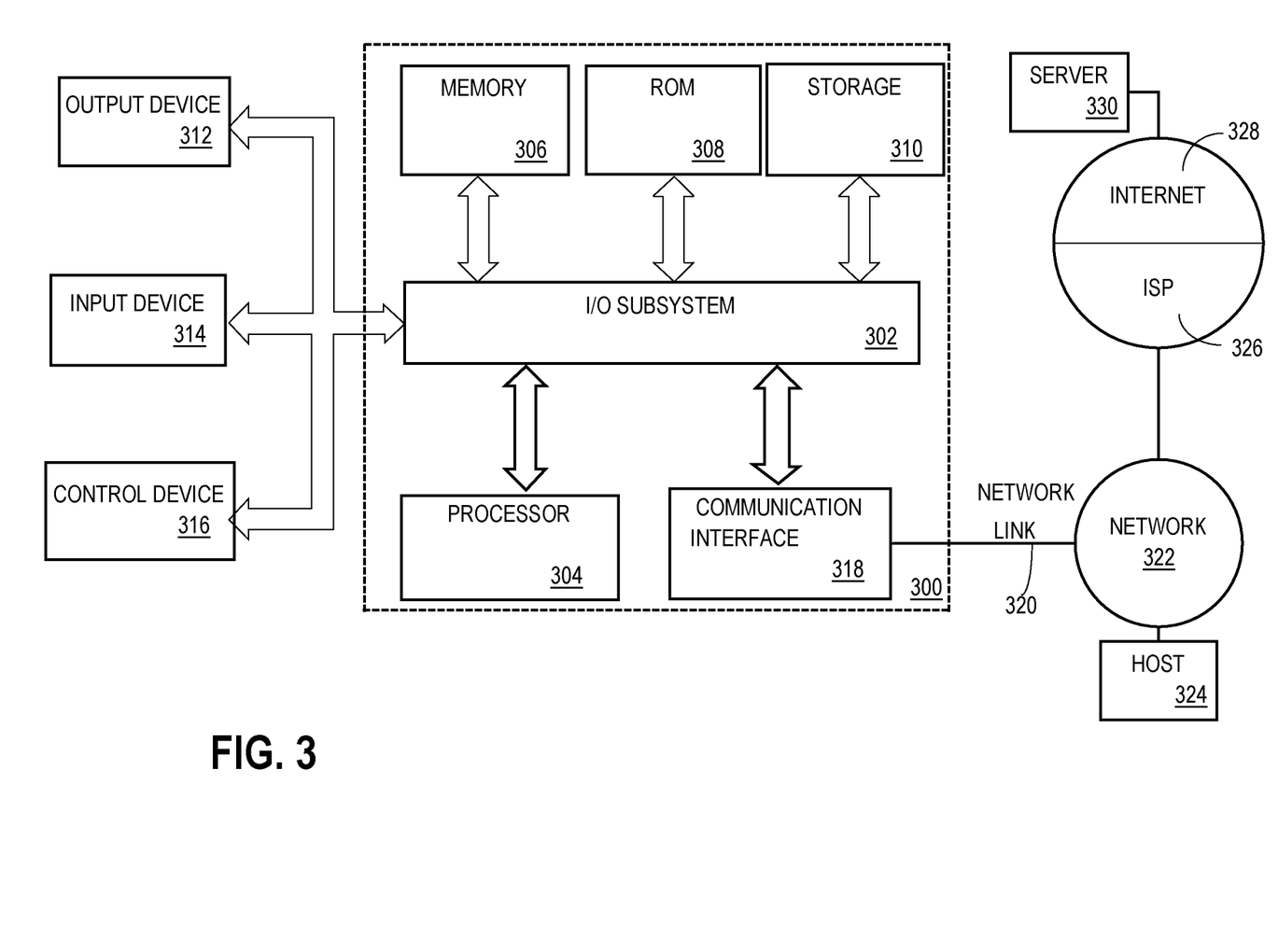
FIG. 3 is a block diagram that illustrates a computer system upon which an embodiment may be implemented.

For example, FIG. 3 is a block diagram that illustrates a computer system upon which an embodiment may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system comprising:
one or more edge devices communicatively coupled to a transaction datastore, the transaction datastore configured to act as a system of record for a type of data for one or more applications; and
a backend computing network hosting one or more applications;
wherein each edge device of the one or more edge devices is configured to perform:
receiving, from a client computing device, a transaction;
prior to communicating with the backend computing network responsive to receiving the transaction, the edge device determining whether the transaction is permitted according to data stored in the transaction datastore; and
responsive to the edge device determining that the transaction is permitted, sending a verification that the transaction is being performed to the client device and forwarding the transaction to the backend computing network;
wherein the backend computing network is configured to perform, the transaction in response to receiving the transaction, wherein performing the transaction includes:
updating a central repository stored at the backend computing network; and
updating the transaction datastore in response to updating the central repository.

2. The system of claim 1, wherein:
the transaction datastore stores a plurality of key-value pairs including account identifiers and account balances; and
the transaction is permitted if a balance in an account referenced by the transaction is greater than a transaction amount included in the transaction according to data stored in the transaction datastore.

3. The system of claim 2, wherein the transaction is a request to transfer funds from an account corresponding to the client computing device.

4. The system of claim 1, further comprising:
a second edge device coupled to a second transaction datastore, the second transaction datastore mirroring the transaction datastore coupled to the one or more edge devices, the second edge device being configured to perform:
receiving, from a second client computing device, a request for transaction information; and
without forwarding the request from the second edge device, responding to the request for transaction information with data stored in the second transaction datastore.

5. The system of claim 1, wherein the one or more edge devices are further configured to perform:
storing a certificate of the client computing device; and
using the certificate, authenticating the client computing device at the one or more edge devices prior to transmitting the update to the backend computing network.

6. A method comprising:
storing, at a particular application edge device, a transaction datastore which acts as a system of record for one or more applications, wherein the transaction datastore stores a plurality of key-value pairs including account identifiers and account balances;
receiving, at the particular application edge device from a client computing device, a request to perform a transaction;
prior to communicating with a backend service responsive to receiving the request to perform the transaction, determining, by the particular application edge device, whether a transaction amount of the transaction is less than a balance recorded in the transaction datastore stored at the particular application edge device;
responsive to the particular edge device determining that the transaction amount is less than the balance recorded in the transaction datastore, sending a verification that the transaction is being performed to the client computing device and forwarding, to the backend service, the transaction;
responsive to the backend service performing the transaction by making one or more updates to one or more records in a central repository, receiving one or more update records indicating the one or more updates made to the one or more records in the central repository; and
updating, by the particular edge device, the transaction datastore stored at the particular application edge device in accordance with the one or more update records.

7. The method of claim 6, further comprising:
receiving, at the particular application edge device from a client computing device, a request for transaction information; and
without forwarding the request from the particular application edge device, responding to the request for transaction information with data stored in the transaction datastore;
wherein the request for transaction information is a request for a balance of an account from one or more applications which use the balance of the account to determine whether to allow one or more transactions.

8. The method of claim 6, wherein the request to perform the transaction is a request to transfer funds from an account corresponding to the client computing device.

9. The method of claim 6, further comprising:
receiving, at the particular application edge device from a client computing device, a request for transaction information;
without forwarding the request from the particular application edge device, responding to the request for transaction information with data stored in the transaction datastore;
storing, at a second application edge device, a second transaction datastore which mirrors the transaction datastore stored at the particular application edge device;
receiving, at the second application edge device from a second client computing device, a second request for transaction information; and without forwarding the request from the second application edge device, responding to the second request for transaction information with data stored in the second transaction datastore.

10. The method of claim 6, further comprising:
receiving, at the particular application edge device from a client computing device, a request for transaction information;
without forwarding the request from the particular application edge device, responding to the request for transaction information with data stored in the transaction datastore;
storing a certificate of the client computing device at the particular application edge device; and
using the certificate, authenticating the client computing device at the particular application edge device prior to responding to the request for transaction information with data stored in the transaction datastore.

11. The system of claim 1, wherein the one or more edge devices comprise at least one of a router, a routing switch, an integrated access device, or a multiplexer.

12. A method comprising:
receiving, at an edge device from a client computing device, a transaction, wherein:
the edge device is communicatively coupled to a transaction datastore; and
the transaction datastore is configured to act as a system of record for a type of data for one or more applications;
prior to communicating with a backend computing network responsive to receiving the transaction, the edge device determining whether the transaction is permitted according to data stored in the transaction datastore; and
responsive to the edge device determining that the transaction is permitted, sending a verification that the transaction is being performed from the edge device to the client device and forwarding the transaction from the edge device to the backend computing network, wherein the backend computing network hosts one or more applications;
responsive to the backend computing network receiving the transaction and performing the transaction by updating a central repository stored at the backend computing network, updating the transaction datastore.

13. The method of claim 12, wherein:
the transaction datastore stores a plurality of key-value pairs including account identifiers and account balances; and
the transaction is permitted if a balance in an account referenced by the transaction is greater than a transaction amount included in the transaction according to data stored in the transaction datastore.

14. The method of claim 13, wherein the transaction is a request to transfer funds from an account corresponding to the client computing device.

15. The method of claim 12, further comprising:
receiving, at a second edge device from a second client computing device, a request for transaction information, wherein:
the second edge device is coupled to a second transaction datastore; and
the second transaction datastore mirrors the transaction datastore coupled to the edge device; and
without forwarding the request from the second edge device, responding to the request for transaction information with data stored in the second transaction datastore.

16. The method of claim 12, further comprising:
storing, by the edge device, a certificate of the client computing device; and
using the certificate, authenticating the client computing device at the edge device prior to transmitting the transaction to the backend computing network.

17. The method of claim 12, wherein the edge device comprises at least one of a router, a routing switch, an integrated access device, or a multiplexer.

* * * * *